US009214111B2

(12) United States Patent
Watanabe

(10) Patent No.: US 9,214,111 B2
(45) Date of Patent: Dec. 15, 2015

(54) IMAGE DISPLAY APPARATUS AND METHOD

(71) Applicant: FUJIFILM Corporation, Tokyo (JP)

(72) Inventor: Mikio Watanabe, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/585,441

(22) Filed: Dec. 30, 2014

(65) Prior Publication Data

US 2015/0116389 A1 Apr. 30, 2015

Related U.S. Application Data

(63) Continuation of application No. PCT/JP2013/069370, filed on Jul. 17, 2013.

(30) Foreign Application Priority Data

Jul. 19, 2012 (JP) .................................. 2012-160669

(51) Int. Cl.
G09G 5/02 (2006.01)
G09G 3/34 (2006.01)
(Continued)

(52) U.S. Cl.
CPC ............ *G09G 3/3406* (2013.01); *G02F 1/1336* (2013.01); *G09G 3/3426* (2013.01); *G09G 3/36* (2013.01); *G09G 2320/0238* (2013.01); *G09G 2320/0646* (2013.01); *G09G 2360/144* (2013.01)

(58) Field of Classification Search
CPC .............. G09G 2310/0237; G09G 2320/0285; G09G 2320/0238; G09G 2320/0646

USPC ................................................... 345/102, 694
See application file for complete search history.

(56) References Cited

U.S. PATENT DOCUMENTS

2009/0231313 A1 9/2009 Teranishi et al.
2009/0262066 A1 10/2009 Oke et al.
(Continued)

FOREIGN PATENT DOCUMENTS

JP 2007-334313 A 12/2007
JP 2009-204825 A 9/2009
(Continued)

OTHER PUBLICATIONS

International Preliminary Report on Patentability, issued in PCT/JP2013/069370, dated Nov. 5, 2014.
(Continued)

*Primary Examiner* — William Boddie
*Assistant Examiner* — Carolyn R Edwards
(74) *Attorney, Agent, or Firm* — Birch, Stewart, Kolasch & Birch, LLP

(57) ABSTRACT

When an environment to appreciate an image displayed on an LCD panel is a normal environment, BLD control is performed according to the second backlight brightness characteristic in which the display brightness in the LCD panel is close to be linear, when it is a dark environment, BLD control is performed according to the first backlight brightness characteristic in which the backlight brightness of the low brightness part of the image is set lower than the second backlight brightness characteristic, and, when it is a bright environment, BLD control is performed according to the third backlight brightness characteristic in which the backlight brightness of the medium brightness part of the image is set higher than the second backlight brightness characteristic.

12 Claims, 11 Drawing Sheets

(51) Int. Cl.
*G02F 1/1335* (2006.01)
*G09G 3/36* (2006.01)

(56) References Cited

U.S. PATENT DOCUMENTS

| | | | |
|---|---|---|---|
| 2010/0220048 A1* | 9/2010 | Yamamura et al. | 345/102 |
| 2011/0025728 A1 | 2/2011 | Baba et al. | |
| 2011/0292018 A1* | 12/2011 | Kubota et al. | 345/211 |
| 2012/0162532 A1 | 6/2012 | Oniki et al. | |
| 2012/0212467 A1* | 8/2012 | Kohtoku | 345/207 |

FOREIGN PATENT DOCUMENTS

| | | |
|---|---|---|
| JP | 2010-152174 A | 7/2010 |
| JP | 2011-48198 A | 3/2011 |
| JP | 2011-53264 A | 3/2011 |

OTHER PUBLICATIONS

International Search Report, issued in PCT/JP2013/069370, dated Oct. 22, 2013.
Written Opinion of the International Searching Authority, issued in PCT/JP2013/069370, dated Oct. 22, 2013.

* cited by examiner

IMAGE DISPLAY APPARATUS AND METHOD

CROSS-REFERENCE TO RELATED APPLICATIONS

This application is a Continuation of PCT International Application No. PCT/JP2013/069370 filed on Jul. 17, 2013, which claims priority under 35 U.S.C§119(a) to Japanese Patent Application No. 2012-160669 filed on Jul. 19, 2012. Each of the above application(s) is hereby expressly incorporated by reference, in its entirety, into the present application.

BACKGROUND OF THE INVENTION

1. Field of the Invention

The present invention relates to an image display apparatus and method, and specifically relates to a technique that controls the backlight brightness of a transparent display panel.

2. Description of the Related Art

In the related art, there is suggested a liquid crystal display apparatus including a function (backlight local dimming (BLD) function) to individually control the backlight brightness of each segment of a backlight unit installed in the back of a liquid crystal panel (PTL 1: Japanese Patent Application Laid-Open No. 2009-204825 and PTL 2: Japanese Patent Application Laid-Open No. 2011-48198).

The liquid crystal display apparatus described in PTL 1 measures the illumination around a display apparatus, performs backlight local dimming control (turns on the BLD function) in a case where the measured illumination is lower than a preset threshold (for example, 200 to 1000 lx (lux)), and does not perform the backlight local dimming control (turns off the BLD function) in a case where the measured illumination is higher than the preset threshold, such that the luminescence brightness of each segment is uniform.

That is, in a case where the illumination is low, it is possible to improve a local contrast feeling by performing the backlight local dimming control. On the other hand, in a case where the illumination is high, a contrast feeling hardly changes even if the backlight local dimming control is performed. Therefore, the current flowed to each light emitting diode (LED) is made constant, such that the degradation of a luminous flux of the LED does not largely vary.

The display apparatus described in PTL 2 detects the illumination on the surface of a liquid crystal panel by a display/sensor unit associated with each segment of a backlight unit, and illuminates each segment so as to provide backlight brightness corrected by a correction value corresponding to the detected illumination. By this means, in a case where part of the liquid crystal panel is in shadow of an object, it is possible to increase the brightness of the shadow part with small outside light illumination and suppress the reflection of the shadow.

SUMMARY OF THE INVENTION

In the invention described in PTL 1, since the backlight local dimming control is turned off when the surroundings are bright, the visibility becomes low. Moreover, in the invention described in PTL 1, since each segment is uniformly illuminated, there is a problem that the power consumption also becomes high.

In the invention described in PTL 2, the illumination on the surface of the liquid crystal panel has to be detected every segment of the backlight unit, and many display/sensor units have to be installed in the display apparatus. Moreover, when low illumination is detected in a case where the outside light is relatively uniform, it is possible to increase the backlight brightness as a whole. Therefore, there is a problem that it unnecessarily becomes high brightness and the power consumption increases.

The present invention is made in view of such circumstances, and it is an object to provide an image display apparatus and method that can display an image of high quality and high visibility without depending on the surrounding brightness and realize low power consumption.

To achieve the above-mentioned object, an image display apparatus according to one mode of the present invention includes: an image acquisition device acquiring an image for display; a transparent display panel that displays the image acquired by the image acquisition device; a backlight unit that is installed in a back of the transparent display panel and can perform brightness control of a backlight with respect to the transparent display panel for each of divided segments; a representative brightness value calculation device calculating a representative brightness value of multiple pixels corresponding to each segment of the backlight unit, with respect to the image acquired by the image acquisition device; a backlight brightness characteristic acquisition device acquiring a backlight brightness characteristic showing a relationship between a representative brightness value and backlight brightness set according to the representative brightness value, acquiring a second backlight brightness characteristic in which display brightness corresponding to an image data value of the image for display is close to be linear when the illumination detected by the illumination detection device is greater than a first threshold and equal to or less than a second threshold that is larger than the first threshold, acquiring a first backlight brightness characteristic in which backlight brightness of a low brightness part of the image for display is set lower than the second backlight brightness characteristic when the detected illumination is equal to or less than the first threshold, and acquiring a third backlight brightness characteristic in which backlight brightness of a medium brightness part of the image for display is set higher than the second backlight brightness characteristic when the detected illumination is greater than the second threshold; and a control device controlling brightness of each segment of the backlight unit based on the backlight brightness characteristic acquired by the backlight brightness characteristic acquisition device and a representative brightness value corresponding to each segment calculated by the representative brightness value calculation device.

According to one mode of the present invention, the display brightness is controlled so as to provide an optimal gradation characteristic according to the illumination (that is, peripheral brightness) of light irradiated to the surface of the transparent display panel. The display brightness is decided by multiplication of the transmittance and backlight brightness of the transparent display panel corresponding to an image data value, but the present invention is designed such that the gradation characteristic of display brightness becomes optimal for peripheral brightness by controlling the brightness of each segment of the backlight unit.

Especially, in the present invention, when the detected illumination is greater than the first threshold and equal to or less than the second threshold that is larger than the first threshold (when the illumination on the surface of transparent display panel is normal illumination), the second backlight brightness characteristic in which the display brightness corresponding to the image data value of the image for display is close to be linear is acquired, and the backlight brightness of each segment is individually controlled (backlight local dimming (BLD) control) according to the acquired second backlight brightness characteristic. Moreover, when the detected illumination is equal to or less than the first threshold (when the illumination on the surface of the transparent display panel is low), the first backlight brightness characteristic in which the backlight brightness of the low brightness part of the image for display is set lower than the second backlight brightness characteristic is acquired, and BLD control is performed according to the acquired first backlight brightness characteristic. That is, by making the backlight brightness of a segment corresponding to the low brightness part lower than normal BLD control, the quality of the low brightness part is made high-quality to make the visibility high, and low power consumption is achieved. In addition, when the detected illumination is greater than the second threshold (when the illumination on the surface of transparent display panel is high), the third backlight brightness characteristic in which the backlight brightness of the medium brightness part of the image for display is set higher than the second backlight brightness characteristic is acquired, and BLD control is performed according to the acquired third backlight brightness characteristic. That is, by making the backlight brightness of a segment corresponding to the medium brightness part higher than normal BLD control, the visual recognition range at the time of high illumination can be expanded.

In the image display apparatus according to another mode of the present invention, it is preferable that the backlight brightness characteristic acquisition device includes: a backlight brightness characteristic storage device storing multiple backlight brightness characteristics including the first, second and third backlight brightness characteristics; and a backlight brightness characteristic selection device selecting one backlight brightness characteristic from multiple backlight brightness characteristics stored in the backlight brightness characteristic storage device based on the illumination detected by the illumination detection device.

In the image display apparatus according to another mode of the present invention, it is preferable that, in the third backlight brightness characteristic, the backlight brightness of the low brightness part of the image for display is set lower than the second backlight brightness characteristic. By making the backlight brightness with respect to the invisible low brightness part at the time of high illumination lower than the second backlight brightness characteristic, more preferably, by making it lower than the first backlight brightness characteristic, low power consumption is achieved.

In the image display apparatus according to another mode of the present invention, it is preferable that, when maximum brightness is assumed to be 100%, the low brightness part of the image for display is less than 13% and the medium brightness part of the image for display is equal to or greater than 13% and equal to or less than about 40%.

In the image display apparatus according to another mode of the present invention, it is preferable that: the illumination detection device detects each surface illumination of multiple display areas of the transparent display panel; and the backlight brightness characteristic acquisition device acquires one backlight brightness characteristic every display area of the transparent display panel, based on each surface illumination of multiple display areas detected by the illumination detection device. Taking into account a case where the surface illumination of the transparent display panel is not uniform, each surface illumination of multiple display areas of the transparent display panel is detected, an appropriate backlight brightness characteristic is acquired every display area, and BLD control corresponding to the acquired backlight brightness characteristic is performed.

In the image display apparatus according to another mode of the present invention, it is preferable that a plurality of the illumination detection device are installed in an outer periphery of the transparent display panel, and each surface illumination of multiple display areas of the transparent display panel is detected by detection outputs of the plurality of the illumination detection device.

In the image display apparatus according to another mode of the present invention, it is preferable that the backlight brightness characteristic acquisition device acquires one backlight brightness characteristic every display area of the transparent display panel, based on each surface illumination of multiple display areas detected by the illumination detection device and a statistic of each surface illumination, or acquires one backlight brightness characteristic with respect to an entire display area of the transparent display panel.

In a case where the difference in the surface illumination of multiple display areas is small based on the statistic of each surface illumination (for example, in a case where the standard deviation of each surface illumination is small), a uniform backlight brightness characteristic is acquired by average illumination of the entire display area. On the other hand, in a case where the difference in the surface illumination of multiple display areas is large, the backlight brightness characteristic is acquired every display area.

In the image display apparatus according to another mode of the present invention, it is preferable that multiple display areas of the transparent display panel include one area at a screen center and multiple areas in a screen periphery that touches this one area. An important image is often displayed on the center of the screen. By this means, BLD control by different backlight brightness characteristics with respect to the image at the image center can be prevented from existing together.

In the invention according to another mode of the present invention, an image display method of controlling a transparent display panel based on an image for display and individually controlling brightness of multiple segments forming a backlight unit installed in a back of the transparent display panel, includes: an image acquisition step of acquiring the image for display; a step of controlling the transparent display panel based on the image acquired in the image acquisition step; a representative brightness value calculation step of calculating a representative brightness value of multiple pixels corresponding to each segment of the backlight unit, with respect to the image acquired in the image acquisition step; an illumination detection step of measuring illumination of light irradiated to a surface of the transparent display panel; a backlight brightness characteristic acquisition step of acquiring a backlight brightness characteristic showing a relationship between a representative brightness value and backlight brightness set according to the representative brightness value, acquiring a second backlight brightness characteristic in which display brightness corresponding to an image data value of the image for display is close to be linear when the illumination detected in the illumination detection step is greater than a first threshold and equal to or less than a second threshold that is larger than the first threshold, acquiring a first backlight brightness characteristic in which backlight brightness of a low brightness part of the image for display is set lower than the second backlight brightness characteristic when the detected illumination is equal to or less than the first threshold, and acquiring a third backlight brightness characteristic in which backlight brightness of a medium brightness part of the image for display is set higher than the second backlight brightness characteristic when the detected illumination is greater than the second threshold; and a control step of controlling brightness of each segment of the backlight unit based on the backlight brightness characteristic acquired in the backlight brightness characteristic acquisition step and a representative brightness value corresponding to each segment calculated in the representative brightness value calculation step.

In the image display method according to another mode of the present invention, it is preferable that the backlight brightness characteristic acquisition step includes: a step of preparing a backlight brightness characteristic storage device storing multiple backlight brightness characteristics including the first, second and third backlight brightness characteristics; and a backlight brightness characteristic selection step of selecting one backlight brightness characteristic from multiple backlight brightness characteristics stored in the backlight brightness characteristic storage device based on the illumination detected in the illumination detection step.

In the image display method according to another mode of the present invention, it is preferable that, in the third backlight brightness characteristic, the backlight brightness of the low brightness part of the image for display is set lower than the second backlight brightness characteristic.

In the image display method according to another mode of the present invention, it is preferable that, when maximum brightness is assumed to be 100%, the low brightness part of the image for display is less than 13% and the medium brightness part of the image for display is equal to or greater than 13% and equal to or less than about 40%.

According to the present invention, since the display brightness is controlled so as to provide an optimal gradation characteristic according to the surrounding brightness, it is possible to display an image of high quality and high visibility without depending on the surrounding brightness and realize low power consumption.

DETAILED DESCRIPTION OF THE PREFERRED EMBODIMENTS

In the following, an embodiment of an image display apparatus and method according to the present invention is described according to the accompanying drawings.

[Configuration of Image Display Apparatus]

Figure 1:
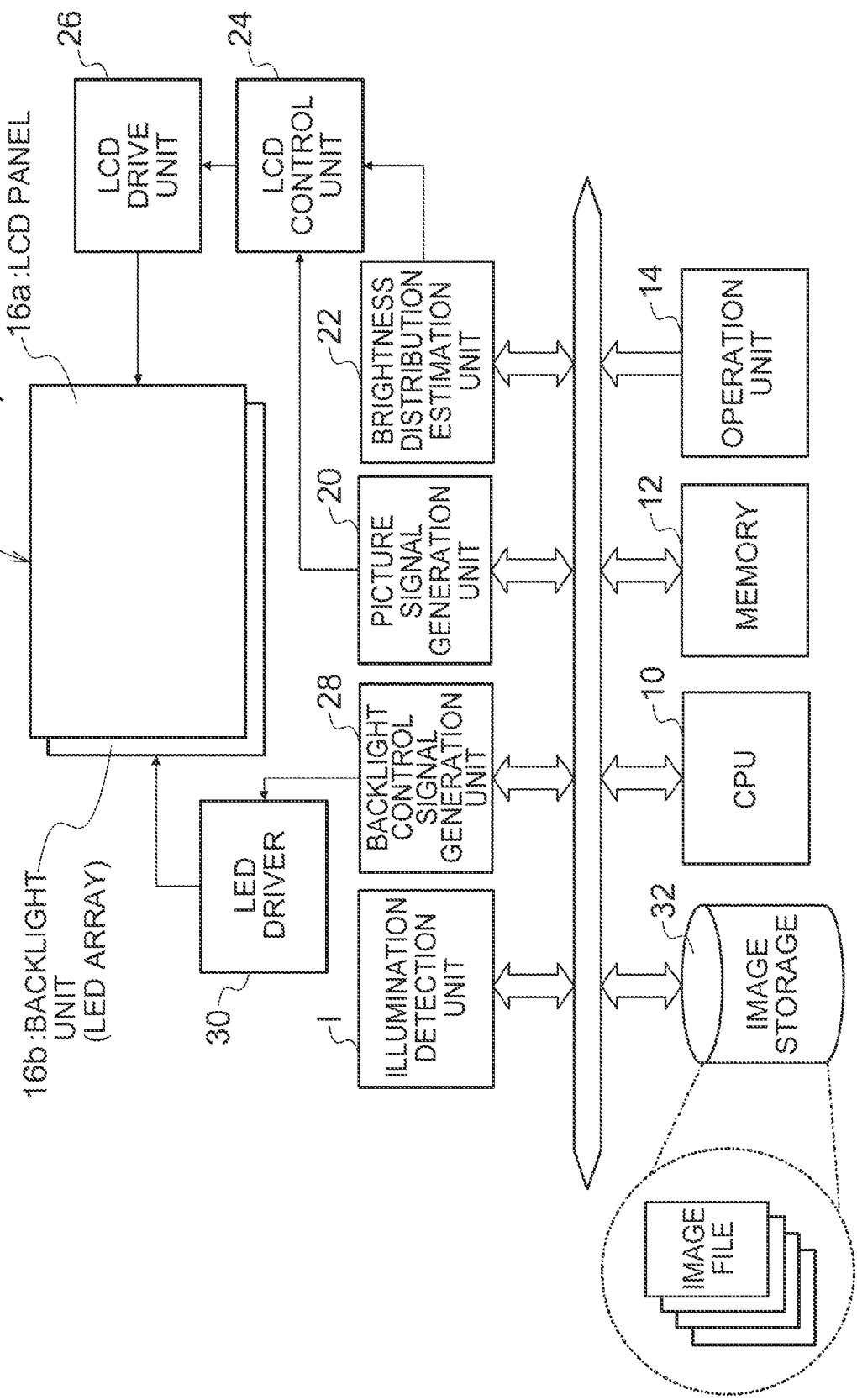
FIG. 1 is a block diagram illustrating an embodiment of an image display apparatus according to the present invention.
Figure 2:
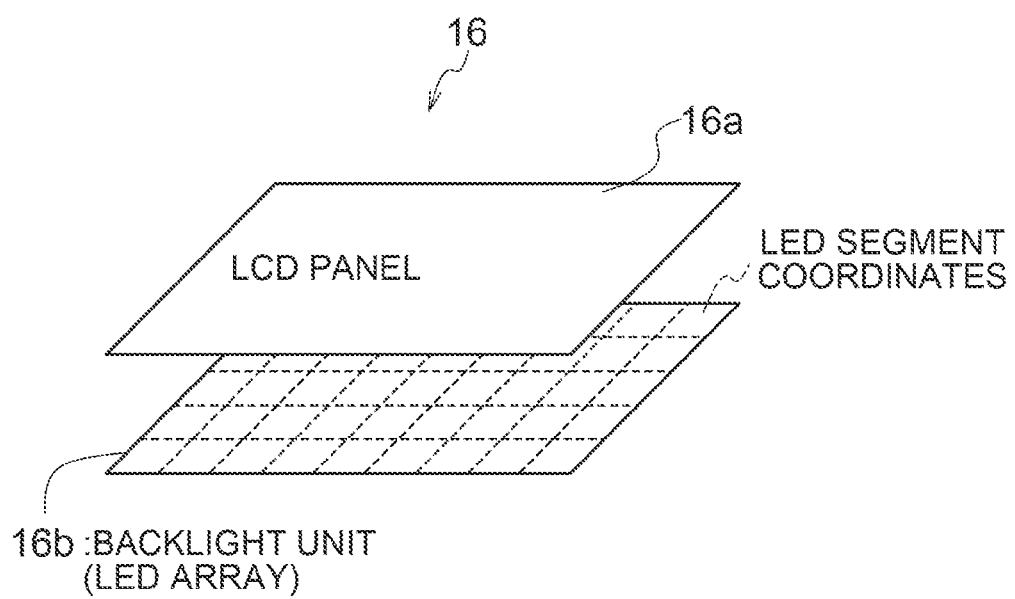
FIG. 2 is a perspective view of a liquid crystal display illustrated in FIG. 1.

FIG. 1 is a block diagram illustrating an embodiment of an image display apparatus according to the present invention, and FIG. 2 is a perspective view of a liquid crystal display illustrated in FIG. 1.

An image display apparatus 1 illustrated in FIG. 1 is a display having a backlight local dimming (BLD) function. The image display apparatus 1 includes a central processing unit (CPU) 10, a memory 12 (backlight brightness characteristic storage device), an operation unit 14, a liquid crystal (LCD) display unit 16 (LCD panel 16a (transparent display panel) and backlight unit (LED array) 16b), a picture signal generation unit 20, the brightness distribution estimation unit 22, the LCD control unit 24, an LCD drive unit 26, a backlight control signal generation unit 28 (representative brightness value calculation device, backlight brightness characteristic acquisition device, backlight brightness characteristic selection device and control device), a light-emitting diode (LED) driver 30, an image storage 32 and illumination detection unit I (illumination detection device).

The CPU 10 performs integrated control of the whole operation of an image display apparatus according to a predetermined control program on the basis of an input from the operation unit 14, and has an image acquisition function to acquire an image file preserved in the image storage 32, expand compression image data (for example, moving image data subjected to motion JPEG (Joint Photographic Experts Group) compression, or still image data subjected to JPEG compression) stored in the image file and acquire the expanded image data.

The memory 12 includes an SDRAM (Synchronous Dynamic Random Access Memory) which is a volatile memory, and an EEPROM (Electronically Erasable and Programmable Read Only Memory, or storage device) which is a rewritable nonvolatile memory. The SDRAM is used as a work area at the time of execution of a control program by the CPU 10 or a storage area that temporarily maintains image data to be reproduced. Meanwhile, the EEPROM stores a program including a BLD control program, tables (backlight brightness setting tables T1 to T3) used for BLD control, various parameters, and so on.

The LCD display unit 16 includes the transparent LCD panel 16a and the backlight unit 16b. The backlight unit 16b is installed in the back of the LCD panel 16a as illustrated in FIG. 2, is formed with an LED array in which one LED is arrayed every LED segment (hereinafter simply referred to as "segment"), and can control luminescence brightness (backlight brightness) every segment. That is, BLD control that individually controls the backlight brightness every segment is applied to the backlight unit 16*b*.

The picture signal generation unit 20 converts image data temporarily memorized in the memory 12 into a picture signal to be displayed on the LCD panel 16*a*, as well as performs reproduction gradation conversion (reverse-gamma correction) corresponding to the gamma characteristic of the LCD display unit 16, and outputs this to the LCD control unit 24. As other inputs for the LCD control unit 24, a correction value to correct the unevenness of backlight brightness of each segment is input from the brightness distribution estimation unit 22. The LCD control unit 24 corrects the picture signal input from the picture signal generation unit 20 by the correction value input from the brightness distribution estimation unit 22, and outputs it to the LCD drive unit 26. The LCD drive unit 26 drives the LCD panel 16*a* by a control signal corresponding to the picture signal added from the LCD control unit 24, and controls the transmittance every LCD element (display element).

Meanwhile, the backlight control signal generation unit 28 includes representative brightness value calculation device that calculates the representative brightness value of multiple pixels (for example, maximum value or average value of multiple pixels, and so on) corresponding to each segment of the backlight unit 16*b*, a backlight brightness setting unit, a backlight control unit (control device), and so on. The backlight control signal generation unit 28 generates a backlight control signal to control the brightness of each segment on the basis of the image reproduced and displayed on the LCD display unit 16 and the illumination of the display area of the LCD panel 16*a* which is detected by illumination detection unit I. Here, details of the backlight control signal generation unit 28 are described later.

The LED driver 30 individually drives the segments of the backlight unit 16*b* by the backlight control signal added from the backlight control signal generation unit 28 and illuminates the backlight subjected to BLD control by each segment.

For example, the image storage 32 is formed with a hard disk drive, and so on, and stores an image file of a moving image or still image to be displayed on the LCD display unit 16. Here, the image storage 32 is not limited to the one incorporated in the apparatus, and may be an external recording medium such as a memory card connected through an interface.

Figure 3:
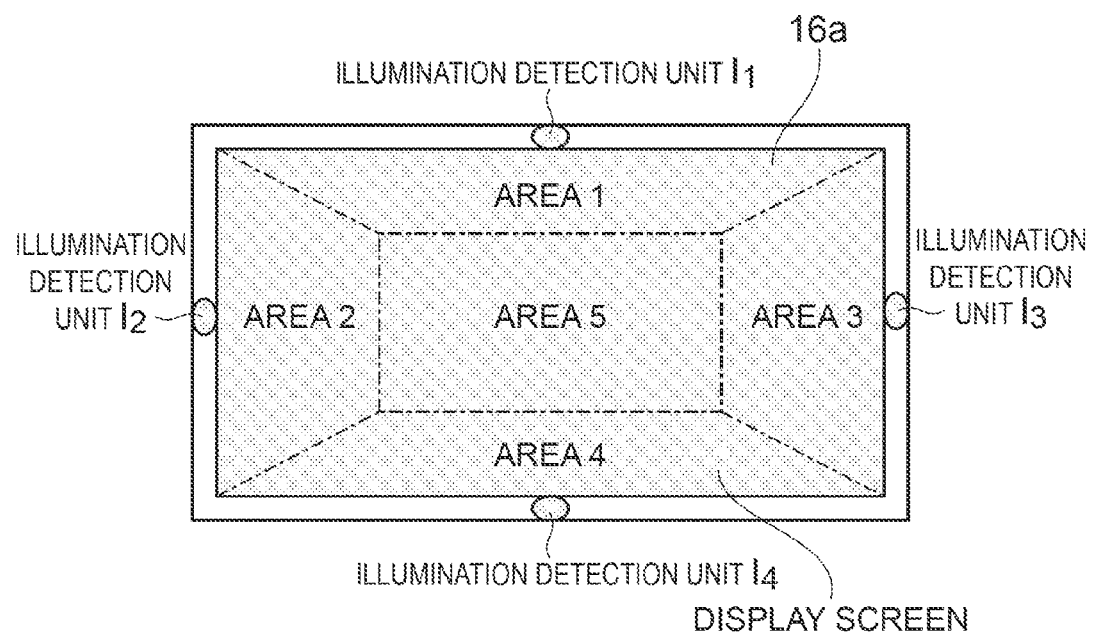
FIG. 3 is a diagram illustrating each display area of an LCD panel and the installation position of an illumination detection unit.

Illumination detection unit I is formed with four illumination detection units $I_1$ to $I_4$ as illustrated in FIG. 3, and respective illumination detection units $I_1$ to $I_4$ are installed in the central parts of four sides of the outer periphery of the LCD panel 16*a* and detect the illumination of light irradiated to multiple areas 1 to 4 of the LCD panel 16*a*. Here, the illumination of area 5 in the screen center of the LCD panel 16*a* is calculated by the average value of the illumination of four surrounding areas 1 to 4.

[BLD Control]

Next, the outline of BLD control of the image display apparatus 1 according to the present invention is described.

Figure 4:
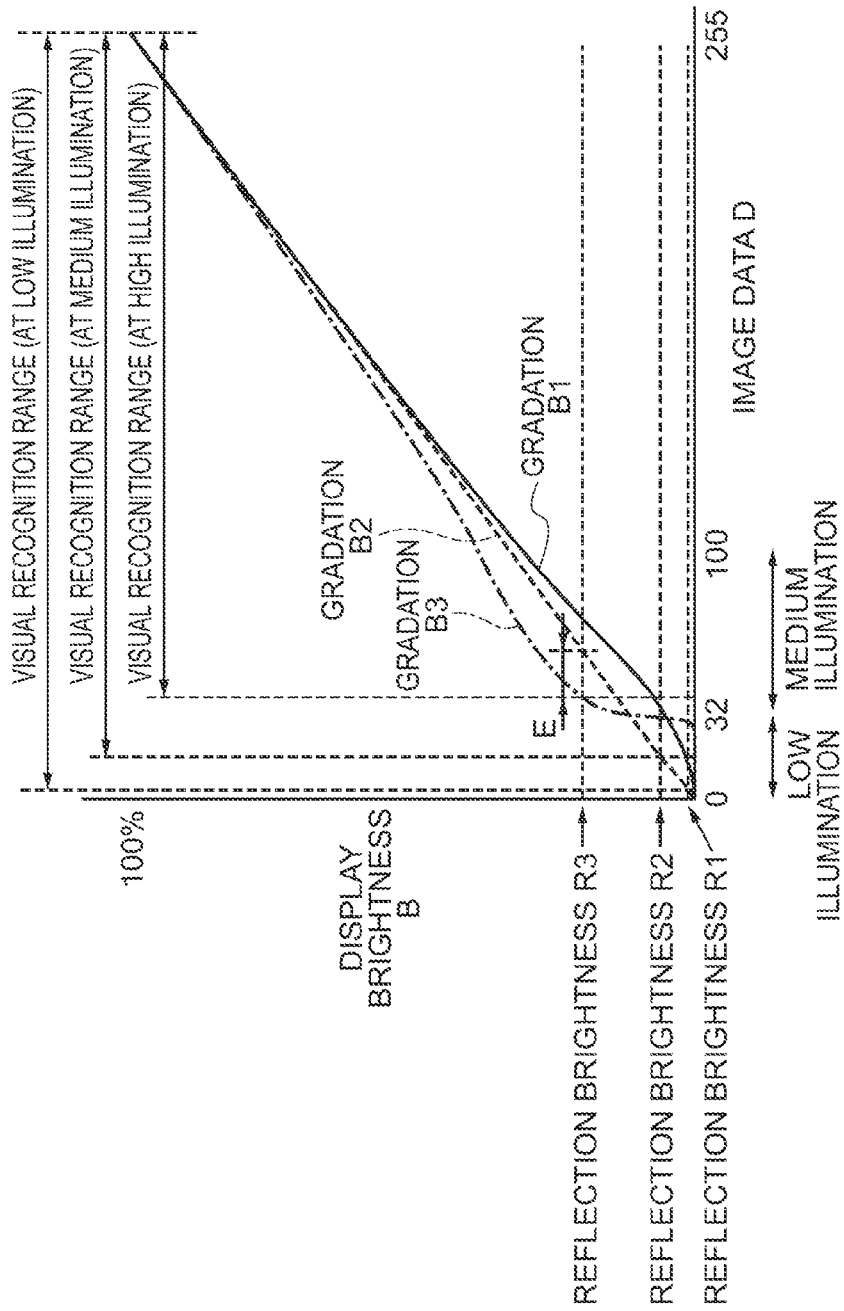
FIG. 4 is a graph illustrating the relationship between the pixel value of input image data and the display brightness, and particularly is a graph illustrating three display gradation characteristics.

FIG. 4 is a graph illustrating the relationship between the pixel value (data of 8 bits) of input image data D and display brightness B thereof, and three display gradations B1, B2 and B3 are shown in this embodiment.

Display gradation B2 has a linear display gradation characteristic with respect to the pixel value of input image data D. Display gradation B1 has a lower display gradation characteristic (downward convex) with respect to the low-brightness pixel value of input image data D as compared with display gradation B2. Display gradation B3 has a further lower display gradation characteristic with respect to the low-brightness pixel value of input image data D than display gradation B1 and has a higher display gradation characteristic (upward convex) with respect to the medium-brightness pixel value of image data D as compared with display gradation B2.

Here, it is preferable to set the image data value corresponding to the low brightness to be, for example, 32 or less with respect to data (0 to 255) of 8 bits, and set the image data value corresponding to the medium brightness to be near 33 to 100. Here, when the maximum brightness of the image is assumed to be 100%, the low brightness of the image is less than 13% and the medium brightness of the image is equal to or greater than 13% and equal to or less than about 40%.

Next, BLD control to acquire linear display gradation B2 is described.

Figure 5A:
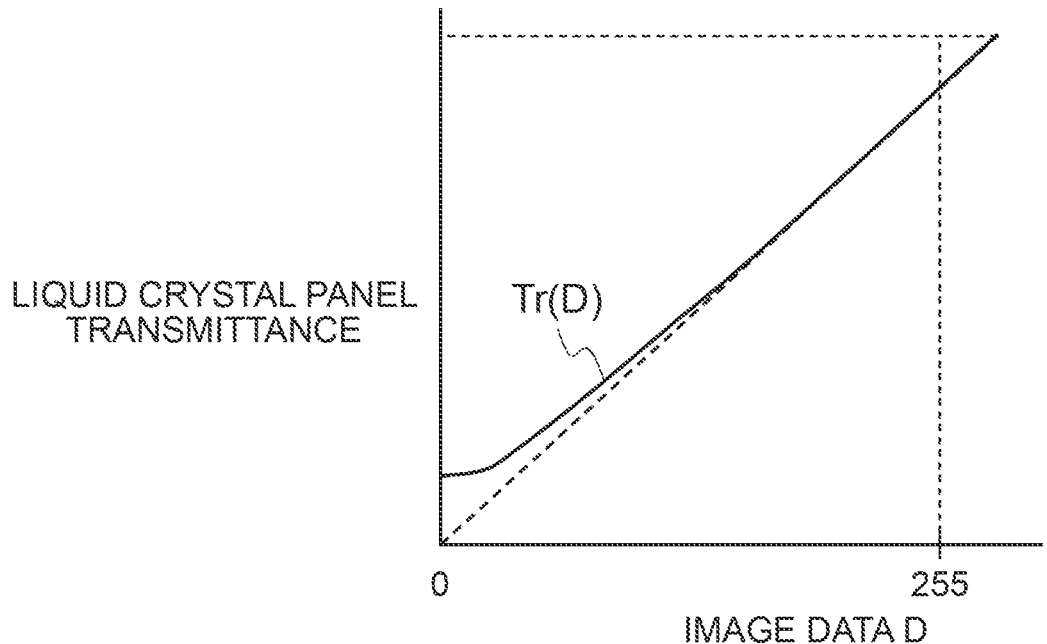
FIG. 5A is a graph illustrating the transmittance of an LCD panel controlled by the pixel value of input image data.

FIG. 5A is a graph illustrating the transmittance of the LCD panel 16*a* controlled by the pixel value of input image data D.

As illustrated in FIG. 5A, the transmittance of the LCD panel 16*a* does not become a linear characteristic in general, and the transmittance of the low brightness part becomes high. If this LCD panel 16*a* is irradiated by a uniform backlight, the low brightness part does not look black, that is, a so-called misadjusted black level occurs.

In the present invention, in a case where the illumination on the surface of the LCD panel 16*a* is the medium illumination (for example, it is said that the illumination of a living room is from 100 lx to 900 lx) under a normal environment, the backlight brightness is controlled such that display gradation B2 becomes linear according to the transmittance characteristic of the LCD panel 16*a*.

Here, when image data value D, backlight brightness setting value BL(D), the transmittance of the LCD panel 16*a* as Tr(D) and a predetermined coefficient as k are assumed, backlight brightness setting value BL(D) to make the display gradation with respect to image data value D linear can be calculated by the following equation.

$$BL(D)=k \times D/Tr(D)$$ [Equation 1]

Figure 5B:
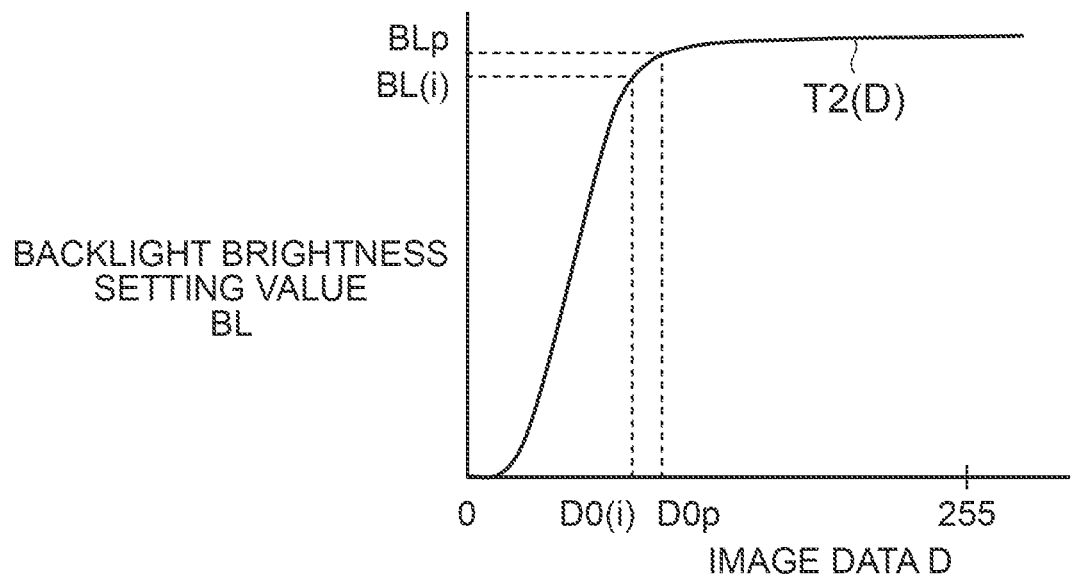
FIG. 5B is a graph illustrating a backlight brightness setting table at the time of normal illumination controlled by the pixel value of input image data.

FIG. 5B illustrates backlight brightness setting table T2(D) to acquire linear display gradation B2. This backlight brightness setting table T2(D) can be calculated from [Equation 1]. Here, when the reflection brightness of the LCD panel 16*a* at the time of medium illumination is assumed to be R2 on FIG. 4, an image of display brightness B higher than this reflection brightness R2 becomes a visual recognition range.

Meanwhile, display gradation B1 in FIG. 4 shows the display gradation characteristic for a dark environment. The illumination in a dark room is generally 25 lx or less. For example, the condition of this illumination corresponds to a condition at the time of appreciation in a movie theater or a condition when a reversal film is watched using a light box in a dark room. In this condition, the brightness of outside light reflected on the surface of the LCD panel 16*a* becomes low (reflection brightness R1 in FIG. 4). In this case, by performing display with the characteristic of display gradation B1 in which the display brightness corresponding to the low brightness part (so-called shadow part) of the image is suppressed to be low, it becomes excellent image quality close to the movies or films.

Moreover, display gradation B3 in FIG. 4 shows the display gradation characteristic for a bright environment. The illumination in a bright room corresponds to the illumination in a room in which the outside light comes in the daytime, and is 900 lx or more. In this environment, the brightness of outside light reflected on the surface of the LCD panel 16*a* becomes high (reflection brightness R3 in FIG. 4). In this case, an invisible area of reflection brightness R3 or less becomes large, and the visibility decreases. Therefore, by performing display with the characteristic of display gradation B3 in which the display brightness of the medium brightness part is higher than display gradation B2, the visual recognition range at the time of high illumination is expanded by range E as compared with that at the time of medium illumination. Moreover, under the environment of high illumination, it is difficult to determine a pixel having display brightness equal to or less than reflection brightness R3. Therefore, display gradation B3 displays the display brightness of the low brightness part by a characteristic lower than display gradation B2 to set the backlight brightness of the low brightness part to a value as low as possible (suppress power consumption), more preferably, displays the display brightness of the low brightness part by a characteristic lower than display gradation B1.

Figure 6:
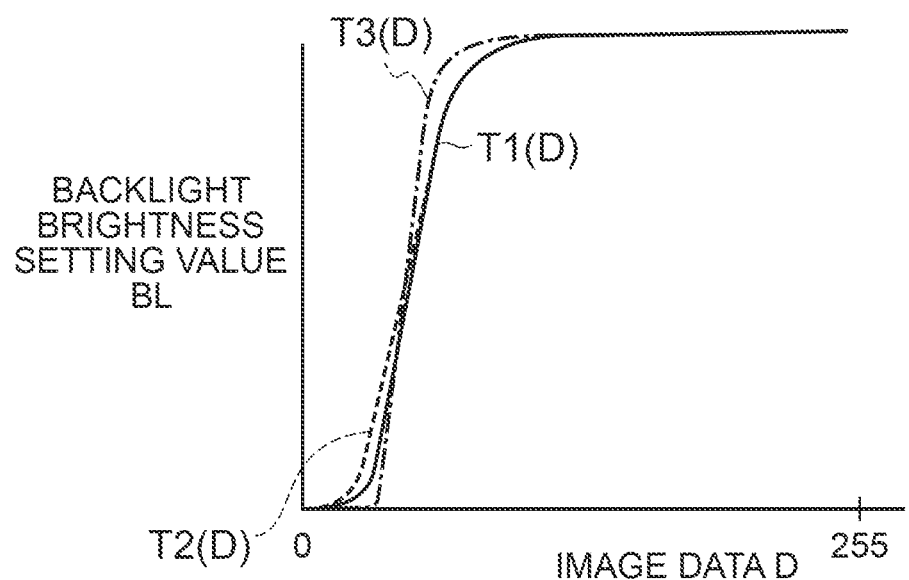
FIG. 6 is a graph illustrating backlight brightness setting tables T2(D) and T3(D) at low illumination and high illumination with respect to the backlight brightness setting table T2(D) to acquire the linear display gradation illustrated in FIG. 5B.

FIG. 6 is a graph illustrating backlight brightness setting table T2(D) to acquire linear display gradation B2 illustrated in FIG. 5B, backlight brightness setting table T1(D) to acquire display gradation B1 at the time of low illumination, and backlight brightness setting table T3(D) to acquire display gradation B3 at the time of high illumination.

As illustrated in FIG. 6, in backlight brightness setting table T1(D) at the time of low illumination, the backlight brightness setting value corresponding to the low brightness part is set smaller than backlight brightness setting table T2(D) at the time of medium illumination. Moreover, in backlight brightness setting table T3(D) at the time of high illumination, the backlight brightness setting value corresponding to the medium brightness part is set higher than backlight brightness setting table T2(D) at the time of medium illumination, and the backlight brightness setting value corresponding to the low brightness part is set lower than backlight brightness setting table T2(D). Here, on FIG. 6, the backlight brightness setting value corresponding to the low brightness part of backlight brightness setting table T3(D) at the time of high illumination is set lower than that of backlight brightness setting table T1(D) at the time of low illumination.

The display brightness of the image displayed on the LCD panel 16a is decided by multiplication of the transmittance (see FIG. 5A) controlled every LCD element according to image data D and the backlight brightness in the back of the LCD panel 16a controlled according to backlight brightness setting tables T1(D) to T3(D), but, by controlling the backlight brightness according to above-mentioned backlight brightness setting table T1(D), T2(D) or T3(D), the characteristic shown in display gradation B1, B2 or B3 in FIG. 4 is acquired.

Next, BLD control of the image display apparatus 1 according to the present invention is described.

Figure 7:
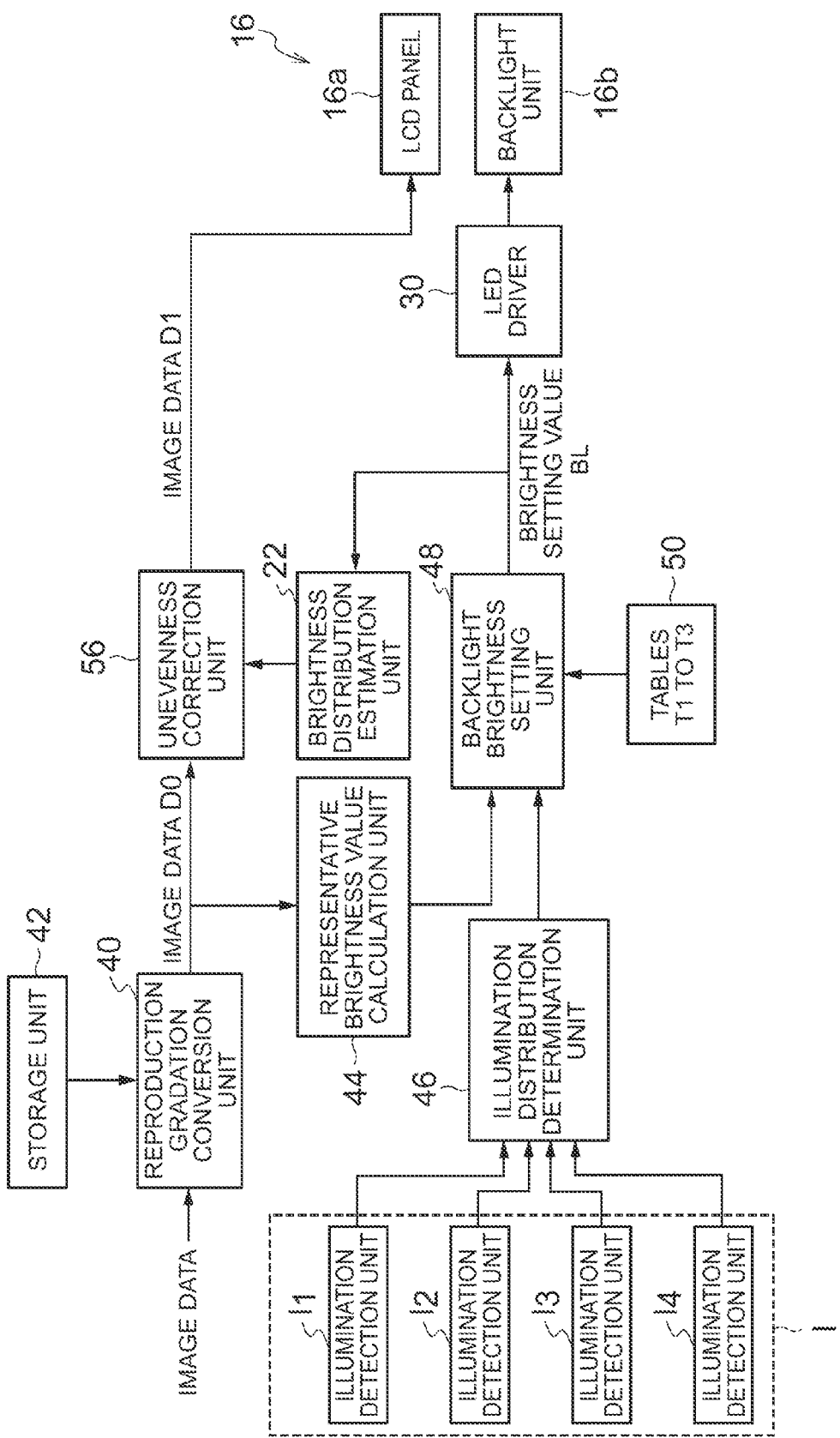
FIG. 7 illustrates main block units of an image display apparatus.

FIG. 7 illustrates main block units of the image display apparatus 1. A reproduction gradation conversion unit 40 in FIG. 7 is included in the picture signal generation unit 20 illustrated in FIG. 1, and an unevenness correction unit 56 is included in the LCD control unit 24. Moreover, a representative brightness value calculation unit 44, an illumination distribution determination unit 46 and a backlight brightness setting unit 48 are included in the backlight control signal generation unit 28 illustrated in FIG. 1.

In FIG. 7, by performing predetermined display gradation conversion, for example, calculating the 2.2th power of input image data (in the case of compression data, data converting YC data after expansion processing into RGB data), the reproduction gradation conversion unit 40 performs gradation conversion when the image data is photographed, for example, calculates the 0.45th power thereof and performs conversion into pixel data D0 of a linear characteristic. This gradation conversion is performed using the γ table having a gradation transfer characteristic of reverse-gamma memorized in a storage unit 42.

Pixel data D0 displayed on one screen is added to the representative brightness value calculation unit 44. Pixel data D0 is divided into zones (segments) in which the backlight brightness is controllable. For example, pixel data included in one segment becomes horizontal 128 pixels and vertical 128 pixels. The representative brightness value calculation unit 44 calculates the pixel value (representative brightness value) that represents each segment. In this example, peak value Dp in the segment is assumed to be a representative value.

Illumination detection unit I ($I_1$ to $I_4$) detects the illumination of four areas 1 to 4 of the LCD panel 16a as illustrated in FIG. 3 and outputs detected illumination information to the illumination distribution determination unit 46. The illumination distribution determination unit 46 calculates average value Sa of the illumination of four areas 1 to 4 and assumes this average value Sa as the illumination of area 5 at the screen center. Moreover, standard deviation Sd of the illumination of five areas 1 to 5 is calculated, and the dispersion of the illumination of each area is calculated. In a case where the difference in the illumination of areas 1 to 5 is small (in a case where standard deviation Sa is small), illumination information showing the average illumination of all areas is output to the backlight brightness setting unit 48. Meanwhile, in a case where the difference in the illumination of areas 1 to 5 is large (in a case where standard deviation Sa is large), illumination information showing the illumination of respective areas 1 to 5 is output to the backlight brightness setting unit 48.

As for other inputs for the backlight brightness setting unit 48, the representative brightness value that represents each segment is added from the representative brightness value calculation unit 44, and the backlight brightness setting unit 48 sets the backlight brightness of each segment on the basis of the illumination information input from the illumination distribution determination unit 46 and the representative brightness value input from the representative brightness value calculation unit 44.

That is, based on the illumination information on an area to which the segment of the representative brightness value belongs, the backlight brightness setting unit 48 selects one backlight brightness setting table from a storage unit 50 that stores multiple backlight brightness setting tables T1(D), T2(D) and T3(D) illustrated in FIG. 6, reads out a backlight brightness setting value corresponding to the representative brightness value from the selected backlight brightness setting table, and assumes it as backlight brightness setting value BL in the segment of the representative brightness value.

When backlight brightness setting value BL every segment is set by the backlight brightness setting unit 48, this backlight brightness setting value BL is output to the LED driver 30. The LED driver 30 individually controls (BLD control) each brightness of the segment of the backlight unit 16b on the basis of backlight brightness setting value BL.

Meanwhile, when the backlight brightness of each segment is set, the brightness distribution estimation unit 22 estimates the backlight brightness distribution. That is, in a case where the backlight brightness of a certain segment and the backlight brightness of a surrounding segment thereof are different, a difference in the backlight brightness (unevenness in the backlight brightness) occurs. The brightness distribution estimation unit 22 outputs information on the estimated backlight brightness distribution to the unevenness correction unit 56.

Pixel data D0 is added to the unevenness correction unit 56, and the unevenness correction unit 56 corrects pixel data to correct the unevenness of the backlight brightness on the basis of the information on backlight brightness distribution input from the brightness distribution estimation unit 22.

Now, when backlight brightness setting table T2(D) to acquire linear display gradation B2 is selected (see FIG. 5B), backlight brightness BLp of the segment is set to the representative brightness value (peak value Dp of the pixel value) in the segment such that the display brightness becomes linear with respect to image data D.

Figure 8:
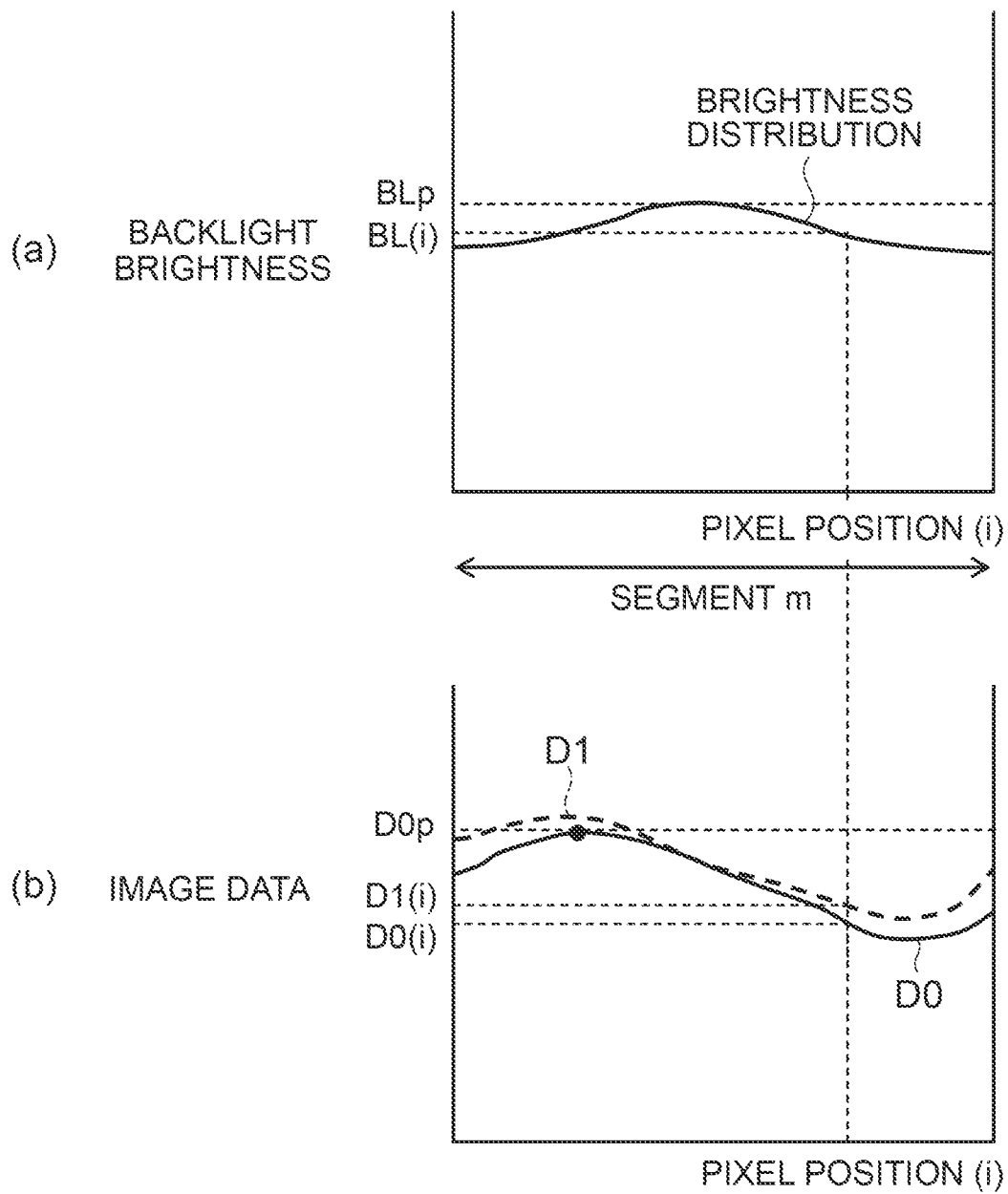
FIG. 8 is a graph illustrating one example of brightness distribution in segment m, and is a diagram illustrating unevenness correction according to the brightness distribution.

Part (a) of FIG. 8 is a graph illustrating one example of brightness distribution in segment m. Here, in part (a) of FIG. 8, the brightness distribution is one-dimensionally shown for easiness.

When backlight brightness BLp of segment in is set to peak value Dp of the pixel value of segment m, the backlight brightness in segment m to which backlight brightness BLp is set has brightness distribution as illustrated in part (a) of FIG. 8, for example. This distribution can be estimated from backlight brightness BLp, the setting brightness of a peripheral segment and the optical characteristic of the backlight unit. Backlight brightness value BL(i) in pixel position (i) of segment m is calculated from the brightness distribution. In this example, backlight brightness BL(i) becomes lower than backlight brightness BLp and becomes brightness unevenness. Unevenness correction processing to correct the brightness unevenness is shown below.

Pixel data value D0(i) corresponding to backlight brightness value BL(i) is calculated from backlight brightness setting table T2(D) (FIG. 5B).

The brightness unevenness is reduced by correcting pixel data value D0(i) to pixel data value D1(i) by the following equation according to this pixel data value D0(i), backlight brightness BL(i) and backlight brightness BLp.

$$D1(i)=D0(i)\times BLp/BL(i) \quad \text{[Equation 2]}$$

When D1 is calculated for all pixels in segment in this way, it is converted into the pixel value as illustrated in the dotted line of part (b) of FIG. 8.

The brightness distribution estimation unit 22 and the unevenness correction unit 56 (FIG. 4) perform the above-mentioned unevenness correction processing.

Pixel data D1 subjected to correction corresponding to the backlight brightness unevenness by the unevenness correction unit 56 is output to the LCD panel 16a, and the transmittance of each LCD element is controlled according to pixel data D1.

[Image Display Method]

Next, an image display method according to the present invention is described.

Figure 9:
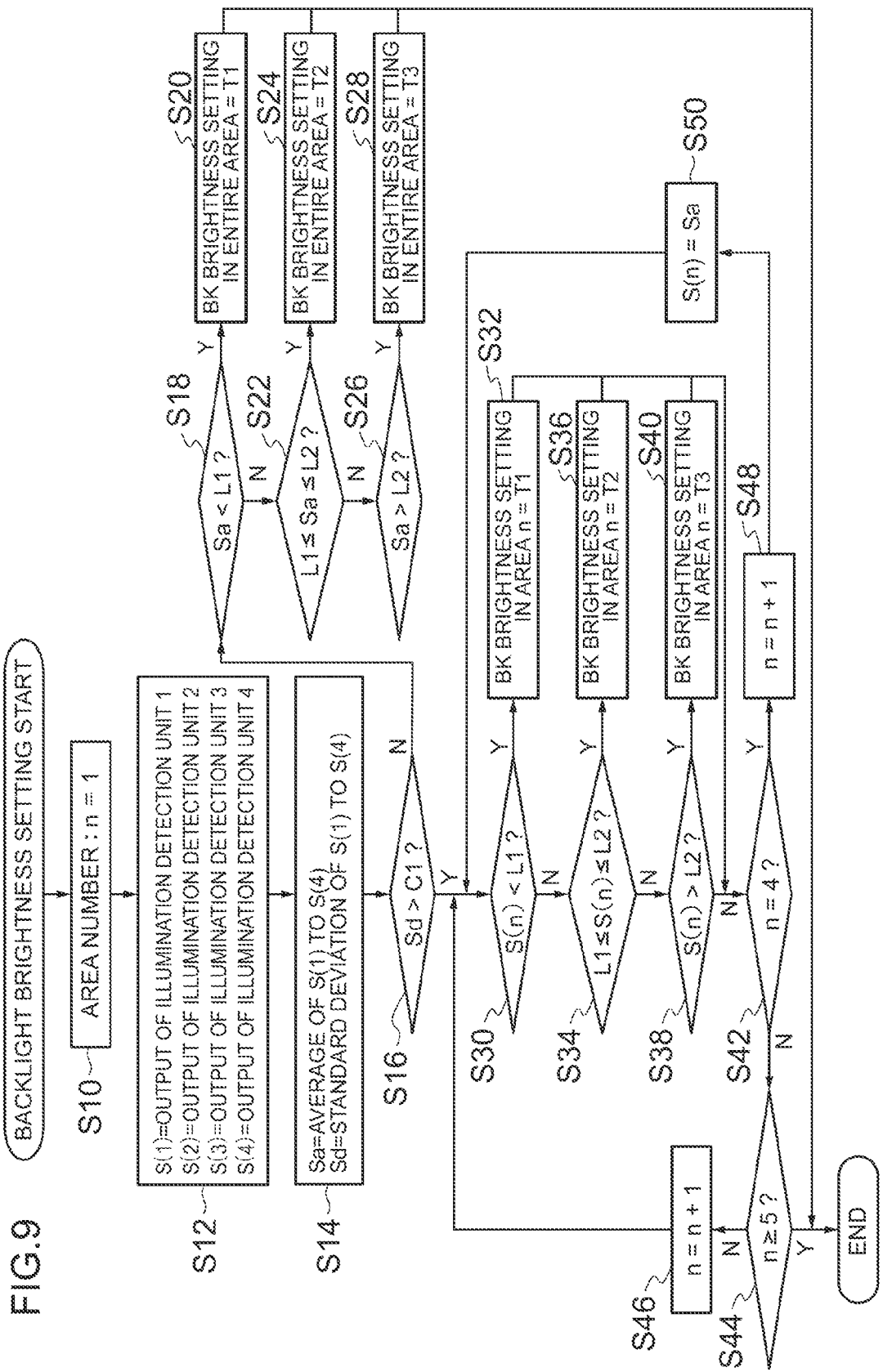
FIG. 9 is a flowchart illustrating an embodiment of an image display method, and particularly is a flowchart illustrating a method of selecting one backlight brightness setting table from backlight brightness setting tables T1(D), T2(D) and T3(D).

FIG. 9 is a flowchart illustrating an embodiment of the image display method according to the present invention, and especially illustrates a method of selecting one backlight brightness setting table from backlight brightness setting tables T1(D), T2(D) and T3(D).

In FIG. 9, parameter n showing the area number of five areas 1 to 5 of the LCD panel 16a (FIG. 3) is set to 1 (step S10), and the output values of illumination detection units $I_1$ to $I_4$ are set as illumination detection values S(1) to S(4) of respective areas 1 to 4 (step S12).

Subsequently, the average value of respective illumination detection values S(1) to S(4) is calculated, the calculated average value is assumed to be Sa, the standard deviation of respective illumination detection values S(1) to S(4) is calculated, and the calculated standard deviation is assumed to be Sd (step S14).

It is determined whether standard deviation Sd is greater than predetermined value C1 (step S16), and, when it is determined to be equal to or less than value C1 (in the case of "No"), it proceeds to step S18. Here, value C1 is a value to determine whether the dispersion in respective illumination detection values S(1) to S(4) is large.

When standard deviation Sd is determined to be equal to or less than value C1, since the dispersion in illumination detection values S(1) to S(4) of respective areas 1 to 4 of the LCD panel 16a is small, a uniform backlight brightness setting table is set with respect to the entire display area.

Figure 10:
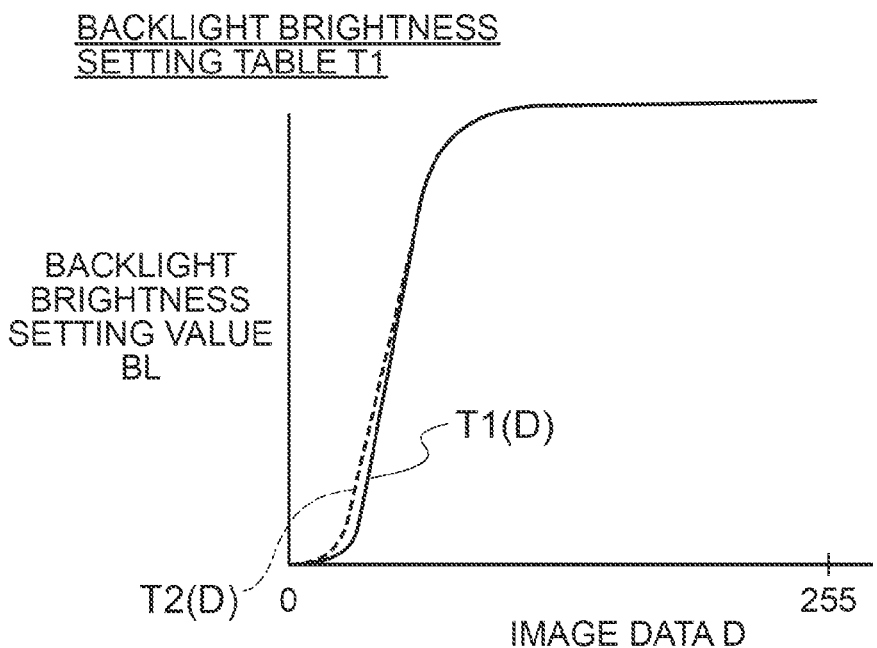
FIG. 10 is a graph illustrating backlight brightness setting table T1 selected in a dark environment.

That is, in step S18, average value Sa of illumination detection values S(1) to S(4) of respective areas 1 to 4 is assumed to be the illumination on the surface of the LCD panel 16a, and it is determined whether average value Sa is less than first threshold L1 (that is, whether it is in a darker environment (than a normal environment)). When it is determined that average value Sa is less than first threshold L1 (in the case of "Yes"), backlight brightness setting table T1 is applied to the entire display area (step S20 and FIG. 10).

In step S22, it is determined whether average value Sa is equal to or greater than first threshold L1 and equal to or less than second threshold L2 (whether it is in a normal environment). When it is determined that average value Sa is equal to or greater than first threshold L1 and equal to or less than second threshold L2 (in the case of "Yes"), backlight brightness setting table T2 is applied to the entire display area (step S24 and FIG. 5B).

Figure 11:
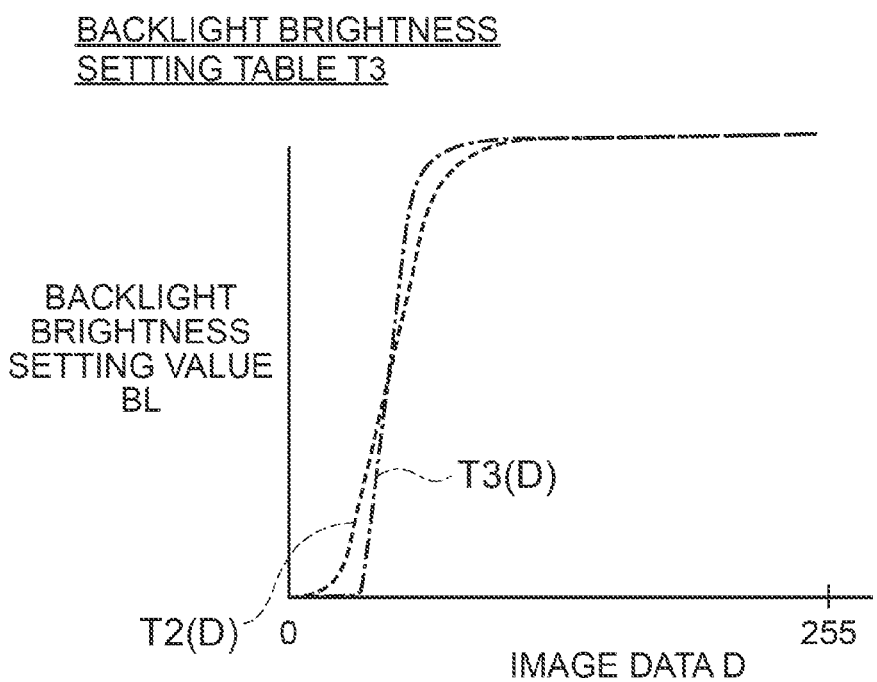
FIG. 11 is a graph illustrating backlight brightness setting table T1 selected in a bright environment.

In step S26, it is determined whether average value Sa is greater than second threshold L2 (that is, whether it is in a brighter environment (than a normal environment)). When it is determined that average value Sa is greater than second threshold L2 (in the case of "Yes"), backlight brightness setting table T3 is applied to the entire display area (step S28 and FIG. 11).

On the other hand, when it is determined that standard deviation Sd is greater than predetermined value C1 in step S16 (in the case of "Yes"), since the dispersion in the illumination of respective areas 1 to 4 of the LCD panel 16a is large, a backlight brightness setting table applied every area is selected as follows.

That is, in step S30, it is determined whether illumination detection value S(n) of area n (n: 1 to 4) is less than first threshold L1. When it is determined that illumination detection value S(n) is less than first threshold L1 (in the case of "Yes"), backlight brightness setting table T1 is applied to area n (step S32 and FIG. 10).

In step S34, it is determined whether illumination detection value S(n) of area n is equal to or greater than first threshold L1 and equal to or less than second threshold L2. When it is determined that illumination detection value S(n) is equal to or greater than first threshold L1 and equal to or less than second threshold L2 (in the case of "Yes"), backlight brightness setting table T2 is applied to area n (step S36 and FIG. 5B).

In step S38, it is determined whether illumination detection value S(n) of area n is greater than second threshold L2. When it is determined that illumination detection value S(n) of area n is greater than second threshold L2 (in the case of "Yes"), backlight brightness setting table T3 is applied to area n (step S40 and FIG. 11).

When the backlight brightness setting table is selected for area n, it is determined whether parameter n of the area number is 4 (n=4) (step S42). It is further determined whether n is equal to or greater than 5 (step S44) in a case where n=4 is not established (in the case of "No"), and, in a case where n is not equal to or greater than 5, n is incremented by 1 (step S46), and it proceeds to step S30.

On the other hand, in a case where n=4 is determined (in the case of "Yes") in step S42, n is incremented by 1 (step S48). That is, n=5 is assumed, and the area number of area 5 at the screen center is set. Subsequently, average value Sa is set as illumination detection value S(n) of area 5 (step S50), and it proceeds to step S30.

When backlight brightness setting tables with respect to areas 1 to 5 of the LCD panel 16a are selected respectively, since n=5 is established, "Yes" is determined in step S44, and the selection of the backlight brightness setting tables ends.

Thus, when a uniform backlight brightness setting table is selected for the entire display area or the backlight brightness setting table of each area is selected, the backlight brightness of each segment is controlled on the basis of the selected backlight brightness setting table and the representative brightness value of each segment.

As mentioned above, backlight brightness setting table T2 is selected under a dark environment, and BLD control in which the display gradation has the characteristic of display gradation B1 illustrated in FIG. 4. That is, the backlight brightness of the low brightness part is made lower than normal display gradation B2, the image quality of the low brightness part is made high-quality to make the visibility high, and low power consumption is intended. Moreover, backlight brightness setting table T3 is selected under a bright environment, and the BLD control in which the display gradation has the characteristic of display gradation B3 illustrated in FIG. 4 is performed. That is, the backlight brightness of the medium brightness part is made higher than normal display gradation B2, the visual recognition range is expanded, the backlight brightness of the invisible low brightness part is lowered as much as possible, and low power consumption is intended.

Moreover, as other embodiments of the image display apparatus 1, for example, there are a portable telephone or smartphone having a camera function, PDA (Personal Digital Assistants) and a portable game machine. In the following, the smartphone is used as an example, and detailed explanation is given with reference to the drawings.

<Configuration of Smartphone>

Figure 12:
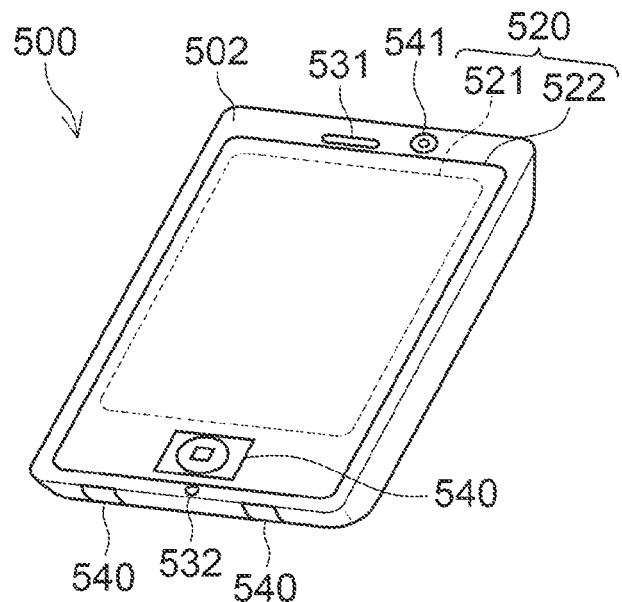
FIG. 12 is an outline drawing of a smartphone that is another embodiment of an image display apparatus.

FIG. 12 illustrates the outline of a smartphone 500 that is another embodiment of the image display apparatus 1. The smartphone 500 illustrated in FIG. 12 has a flat chassis 502, and includes a display input unit 520 integrally combining a display panel 521 as a display unit in one surface of the chassis 502 and an operation panel 522 as an input unit. Moreover, the chassis 502 includes a speaker 531, a microphone 532, an operation unit 540 and a camera unit 541. Here, the configuration of the chassis 502 is not limited to this. For example, it is possible to adopt a configuration in which the display unit and the input unit are independent, or a configuration having a folded configuration or a sliding mechanism.

Figure 13:
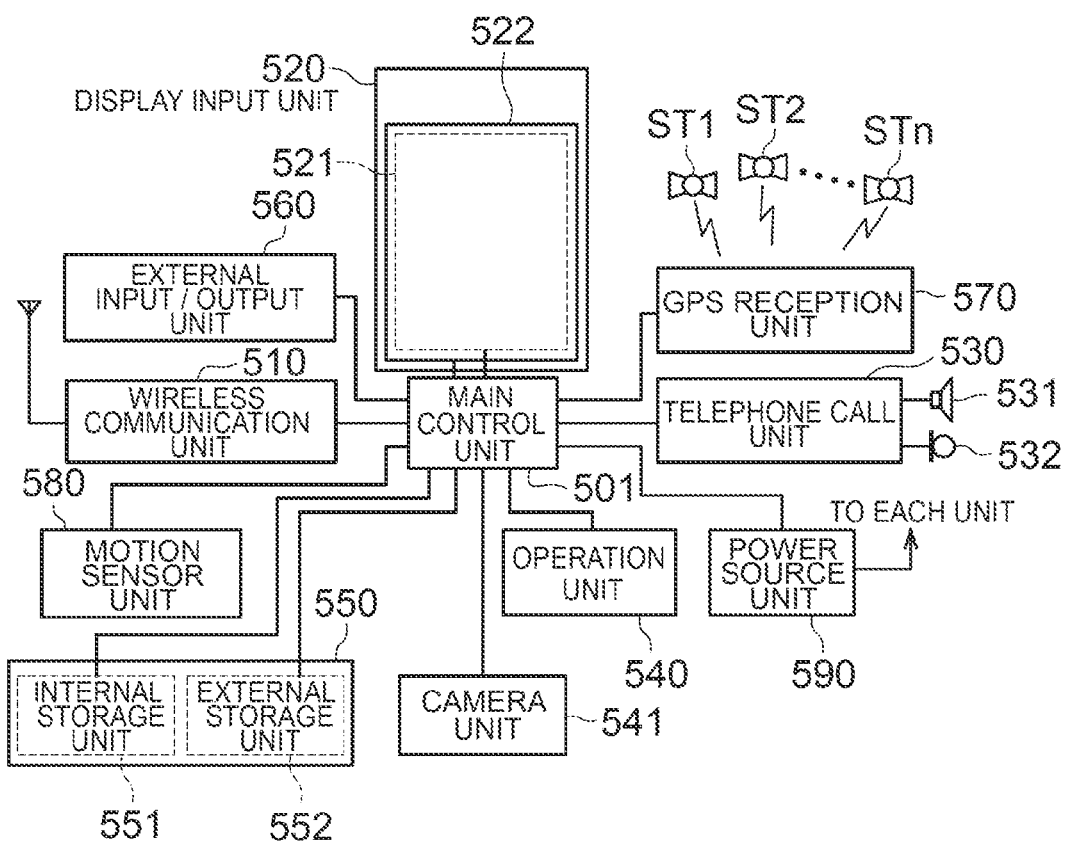
FIG. 13 is a block diagram illustrating main components of a smartphone.

FIG. 13 is a block diagram illustrating the configuration of the smartphone 500 illustrated in FIG. 12. As illustrated in FIG. 13, the smartphone 500 includes a wireless communication unit 510, the display input unit 520, a communication unit 530, the operation unit 540, the camera unit 541, a storage unit 550, an external input/output unit 560, a GPS (Global Positioning System) reception unit 570, a motion sensor unit 580, a power source unit 590 and a main control unit 501. Moreover, as a main function of the smartphone 500, it has a wireless communication function to perform mobile wireless communication through base station apparatus BS and mobile communication network NW.

The wireless communication unit 510 performs wireless communication with base station apparatus BS housed in mobile communication network NW according to an instruction of the main control unit 501. Transmission and reception of various kinds of file data such as voice data and image data, and email data, and reception of Web data and streaming data, and so on, are performed using this wireless communication.

The display input unit 520 is a so-called touch panel that displays an image (still image and moving image), character information, and so on, by control of the main control unit 501, visually conveys information to the user and detects the user operation with respect to the displayed information, and includes the display panel 521 and the operation panel 522. In a case where a generated 3D image is appreciated, it is preferable that the display panel 521 is a 3D display panel.

The display panel 521 uses an LCD (Liquid Crystal Display), an OELD (Organic Electro-Luminescence Display), and so on, as a display device. The display panel 521 of this example is formed with an LCD panel having a backlight unit, and has a backlight local dimming (BLD) function.

The operation panel 522 is a device that is placed such that an image displayed on the display surface of the display panel 521 can be visually recognized, and detects one or multiple coordinates operated by user's finger or stylus. When the operation panel 522 is operated by user's finger or stylus, the operation panel 522 outputs a detection signal generated in response to the operation to the main control unit 501. Next, the main control unit 501 detects the operation position (coordinates) on the display panel 521 on the basis of the received detection signal.

As illustrated in FIG. 12, the display panel 521 and the operation panel 522 of the smartphone 500 integrally form the display input unit 520, and the operation panel 522 is disposed so as to completely cover the display panel 521. In a case where this disposition is adopted, the operation panel 522 may have a function to detect user's operation even in an area outside the display panel 521. In other words, the operation panel 522 may include a detection area about an overlapping part that overlaps with the display panel 521 (hereafter referred to as "display area") and a detection area about the remaining outer edge part that does not overlap with the display panel 521 (hereafter referred to as "non-display area").

Here, the size of the display area and the size of the display panel 521 may be completely matched, but both of them do not have to be necessarily matched. Moreover, the operation panel 522 may include two sensitive areas of the outer edge part and the remaining inner part. In addition, the width of the outer edge part is arbitrarily designed according to the size of the chassis 502, and so on. Furthermore, as a position detection system adopted in the operation panel 522, there are assumed a matrix switch system, a resistance film system, a surface elastic wave system, an infrared ray system, an electromagnetic induction system, an electrostatic capacity system, and so on, and any system can be adopted.

The communication unit 530 includes the speaker 531 and the microphone 532, converts user's voice input through the microphone 532 into processable voice data in the main control unit 501 and outputs it to the main control unit 501, and decodes voice data received by the wireless communication unit 510 or the external input/output unit 560 and outputs it from the speaker 531. Moreover, as illustrated in FIG. 12, for example, it is possible to mount the speaker 531 to the same surface as a surface on which the display input unit 520 is installed, and mount the microphone 532 to the side surface of the chassis 502.

The operation unit 540 is a hardware key using a key switch, and so on, and receives an instruction from the user. For example, as illustrated in FIG. 12, the operation unit 540 is a push-button switch that is mounted to the lower part or lower side surface of the display unit of the chassis 502 of the smartphone 500, turned on when being pressed by a finger or the like, and enters an OFF state by the restoring force of a spring or the like when the finger is taken off.

The storage unit 550 stores a control program or control data of the main control unit 501, backlight brightness setting tables T1(D), T2(D) and T3(D) (see FIG. 6), address data associating the name and telephone number of the communicating party, data of transmitted/received email, Web data downloaded by Web browsing and downloaded content data, or temporarily stores streaming data, and so on. Moreover, the storage unit 550 is formed with an internal storage unit 551 in the smartphone and an external storage unit 552 having a detachable external memory slot. Here, each of the internal storage unit 551 and the external storage unit 552 forming the storage unit 550 are realized using a storage medium such as a memory of the flash memory type, hard disk type, multimedia card micro type or card type (for example, Micro SD (registered trademark) memory), a RAM (Random Access Memory) and a ROM (Read Only Memory).

The external input/output unit 560 plays a role of an interface with all external devices coupled with the smartphone 500, and directly or indirectly connects with other external devices by communication (for example, universal serial bus (USB) and IEEE1394, and so on) or network (for example, the Internet, wireless LAN, Bluetooth (registered trademark), RFID (Radio Frequency Identification), infrared data association (IrDA) (registered trademark), UWB (Ultra Wideband) (registered trademark) and ZigBee (registered trademark), and so on).

As an external device coupled with the smartphone 500, for example, there are a wired/wireless headset, a wired/wireless external charger, a wired/wireless data port, a memory card or SIM (Subscriber Identity Module) card/UIM (User Identity Module) card connected through a card socket, an external audio/video device connected through an audio/video I/O (Input/Output) terminal, a wireless-connection external audio/video device, a wire/wireless-connection smartphone, a wire/wireless-connection personal computer, a wire/wireless-connection PDA, a wire/wireless-connection personal computer, earphones, and so on. The external input/output unit can convey data transmitted from such an external device, to each component in the smartphone 500, and transmit data in the smartphone 500 to the external device.

The GPS reception unit 570 receives GPS signals transmitted from GPS satellites ST1 to STn according to an instruction of the main control unit 501, performs positioning operation processing based on multiple received GPS signals, and detects a position formed with the latitude, longitude and altitude of the smartphone 500. When it is possible to acquire position information from the wireless communication unit 510 or the external input/output unit 560 (for example, wireless LAN), the GPS reception unit 570 can detect the position by the use of the position information.

For example, the motion sensor unit 580 includes a three-axis acceleration sensor, and detects a physical motion of the smartphone 500 according to an instruction of the main control unit 501. By detecting the physical motion of the smartphone 500, the motion direction or acceleration of the smartphone 500 is detected. This detection result is output to the main control unit 501.

The power source unit 590 supplies power accumulated in a battery (not illustrated) to each part of the smartphone 500 according to an instruction of the main control unit 501.

The main control unit 501 includes a microprocessor, performs operation according to a control program or control data stored in the storage unit 550 and integrally controls each part of the smartphone 500. Moreover, to perform voice communication and data communication through the wireless communication unit 510, the main control unit 501 has a mobile communication control function to control each part of the communication system, and an application processing function.

Moreover, the main control unit 501 selects any one table among backlight brightness setting tables T1(D), T2(D) and T3(D) stored in the storage unit 550 depending on the surface illumination of the display panel 521, and performs BLD control of the backlight unit according to the selected table. Here, the illumination of the display area of the display panel 521 may be detected by installing a dedicated illumination detection unit, or may be detected by the camera unit 541.

The application processing function is realized when the main control unit 501 performs operation according to application software stored in the storage unit 550. As the application processing function, for example, there are an infrared data association function to control the external input/output unit 560 and perform data communication with an opposing device, an email function to transmit/receive email, a Web browsing function to browse a Web page, a BLD control function according to the present invention, and so on.

Moreover, the main control unit 501 has an image processing function including displaying a picture on the display input unit 520 on the basis of image data (still image or moving image data) such as reception data, downloaded streaming data, and so on. The image processing function denotes a function that the main control unit 501 decodes the above-mentioned image data, performs image processing on this decoding result and displays an image on the display input unit 520.

In addition, the main control unit 501 performs display control with respect to the display panel 521 and operation detection control to detect user operation through the operation unit 540 and the operation panel 522.

By performing the display control, the main control unit 501 displays an icon to activate application software or a software key such as a scroll bar, or displays a window to create email. Here, the scroll bar denotes a software key to receive an instruction that moves the display part of an image which is a large image that cannot be settled in the display area of the display panel 521.

Moreover, by performing the operation detection control, the main control unit 501 detects the user operation through the operation unit 540, receives operation with respect to the above-mentioned icon or an input of a character string to the entry field of the above-mentioned window through the operation panel 522, or receives a scroll request of a display image through the scroll bar.

In addition, by performing the operation detection control, the main control unit 501 has a touch panel control function to determine whether the operation position with respect to the operation panel 522 is an overlapping part (display area) that overlaps with the display panel 521 or it is the remaining outer edge part (non-display area) that does not overlap with the display panel 521, and control the sensitive area of the operation panel 522 and the display position of a software key.

Moreover, the main control unit 501 can detect gesture operation with respect to the operation panel 522 and execute a preset function according to the detected gesture operation. The gesture operation does not mean simple touch operation in the related art but means operation to draw a trajectory by a finger or the like, specify multiple positions at the same time or combine these and draw a trajectory about at least one of multiple positions.

The camera unit 541 is a digital camera that takes an electronic image by the use of imaging elements such as a CMOS (Complementary Metal Oxide Semiconductor) and a CCD (Charge-Coupled Device). Moreover, by the control of the main control unit 501, for example, the camera unit 541 can convert image data acquired by imaging into compressed image data like JPEG (Joint Photographic coding Experts Group), record it in the storage unit 550 and output it through the external input/output unit 560 or the wireless communication unit 510. In the smartphone 500 illustrated in FIG. 12, the camera unit 541 is mounted to the same surface as the display input unit 520, but the mounting position of the camera unit 541 is not limited to this. For example, the camera unit 541 may be mounted to the back of the display input unit 520 or multiple cameras 541 may be mounted. Here, in a case where multiple cameras 541 are mounted, the camera unit 541 provided for imaging can be switched to take an image alone, or multiple cameras 541 can be used at the same time to take an image.

Moreover, the camera unit 541 can be used for various functions of the smartphone 500. For example, it is possible to display an image acquired by the camera unit 541 on the display panel 521 or use the image of the camera unit 541 as one of operation inputs of the operation panel 522. Moreover, when the GPS reception unit 570 detects a position, it is possible to detect the position with reference to the image from the camera unit 541. Furthermore, with reference to the image from the camera unit 541, it is possible to determine the optical axis direction of the camera unit 541 of the smartphone 500 and determine the current use environment without using the three-axis acceleration sensor or by using the three-axis acceleration sensor together. Naturally, it is possible to use the image from the camera unit 541 in application software.

[Others]

In this embodiment, one backlight brightness setting table (That is, backlight brightness characteristic) is selected from three backlight brightness setting tables T1(D), T2(D) and T3(D) on the basis of the surface illumination of the LCD panel 16a, but the backlight brightness characteristics are not limited to three.

Moreover, in this embodiment, backlight brightness setting tables T1(D), T2(D) and T3(D) are stored in the storage unit 50 beforehand and arbitrary backlight brightness setting table is selected according to the illumination detected from this storage unit 50 by illumination detection unit I. However, it is not limited to this, and, for example, by previously storing formulas showing the characteristics of backlight brightness setting tables T1(D), T2(D) and T3(D) or parameters used for a formula, an arbitrary formula or parameter may be used according to the illumination detected in the illumination detection unit to calculate the backlight brightness characteristics corresponding to backlight brightness setting tables T1(D), T2(D) and T3(D).

In addition, it is not limited to a case where multiple illumination detection units $I_1$ to $I_4$ are installed, and the illumination of the entire display area of the LCD panel may be detected by one illumination detection unit or the illumination may be detected for each of multiple areas dividing the entire display area.

Moreover, it is needless to say that the present invention is not limited to the above-mentioned embodiment and various changes can be made without departing from the spirit of the present invention.

What is claimed is:

1. An image display apparatus comprising:
   an image acquisition device acquiring an image for display;
   a transparent display panel that displays the image acquired by the image acquisition device;
   a backlight unit that is installed in a back of the transparent display panel and can perform brightness control of a backlight with respect to the transparent display panel for each of divided segments;
   a representative brightness value calculation device calculating a representative brightness value of multiple pixels corresponding to each segment of the backlight unit, with respect to the image acquired by the image acquisition device;
   an illumination detection device measuring illumination of light irradiated to a surface of the transparent display panel;
   a backlight brightness characteristic acquisition device acquiring a backlight brightness characteristic showing a relationship between a representative brightness value and backlight brightness set according to the representative brightness value, acquiring a second backlight brightness characteristic in which display brightness corresponding to an image data value of the image for display is close to be linear when the illumination detected by the illumination detection device is greater than a first threshold and equal to or less than a second threshold that is larger than the first threshold, acquiring a first backlight brightness characteristic in which backlight brightness of a low brightness part of the image for display is set lower than the second backlight brightness characteristic when the detected illumination is equal to or less than the first threshold, and acquiring a third backlight brightness characteristic in which backlight brightness of a medium brightness part of the image for display is set higher than the second backlight brightness characteristic when the detected illumination is greater than the second threshold; and
   a control device controlling brightness of each segment of the backlight unit based on the backlight brightness characteristic acquired by the backlight brightness characteristic acquisition device and a representative brightness value corresponding to each segment calculated by the representative brightness value calculation device.

2. The image display apparatus according to claim 1, wherein the backlight brightness characteristic acquisition device includes:
   a backlight brightness characteristic storage device storing multiple backlight brightness characteristics including the first, second and third backlight brightness characteristics; and
   a backlight brightness characteristic selection device selecting one backlight brightness characteristic from multiple backlight brightness characteristics stored in the backlight brightness characteristic storage device based on the illumination detected by the illumination detection device.

3. The image display apparatus according to claim 1, wherein, in the third backlight brightness characteristic, the backlight brightness of the low brightness part of the image for display is set lower than the second backlight brightness characteristic.

4. The image display apparatus according to claim 1, wherein, when maximum brightness is assumed to be 100%, the low brightness part of the image for display is less than 13% and the medium brightness part of the image for display is equal to or greater than 13% and equal to or less than about 40%.

5. The image display apparatus according to claim 1, wherein:
   the illumination detection device detects each surface illumination of multiple display areas of the transparent display panel; and
   the backlight brightness characteristic acquisition device acquires one backlight brightness characteristic every display area of the transparent display panel, based on each surface illumination of multiple display areas detected by the illumination detection device.

6. The image display apparatus according to claim 5, wherein a plurality of the illumination detection device are installed in an outer periphery of the transparent display panel, and each surface illumination of multiple display areas of the transparent display panel is detected by detection outputs of the plurality of the illumination detection device.

7. The image display apparatus according to claim 5, wherein the backlight brightness characteristic acquisition device acquires one backlight brightness characteristic every display area of the transparent display panel, based on each surface illumination of multiple display areas detected by the illumination detection device and a statistic of each surface illumination, or acquires one backlight brightness characteristic with respect to an entire display area of the transparent display panel.

8. The image display apparatus according to claim 5, wherein multiple display areas of the transparent display panel include one area at a screen center and multiple areas in a screen periphery that touches this one area.

9. An image display method of controlling a transparent display panel based on an image for display and individually controlling brightness of multiple segments forming a backlight unit installed in a back of the transparent display panel, the method comprising:
   an image acquisition step of acquiring the image for display;
   a step of controlling the transparent display panel based on the image acquired in the image acquisition step;
   a representative brightness value calculation step of calculating a representative brightness value of multiple pixels corresponding to each segment of the backlight unit, with respect to the image acquired in the image acquisition step;
   an illumination detection step of measuring illumination of light irradiated to a surface of the transparent display panel;
   a backlight brightness characteristic acquisition step of acquiring a backlight brightness characteristic showing a relationship between a representative brightness value and backlight brightness set according to the representative brightness value, acquiring a second backlight brightness characteristic in which display brightness corresponding to an image data value of the image for display is close to be linear when the illumination detected in the illumination detection step is greater than a first threshold and equal to or less than a second threshold that is larger than the first threshold, acquiring a first backlight brightness characteristic in which backlight brightness of a low brightness part of the image for display is set lower than the second backlight brightness characteristic when the detected illumination is equal to or less than the first threshold, and acquiring a third backlight brightness characteristic in which backlight brightness of a medium brightness part of the image for display is set higher than the second backlight brightness characteristic when the detected illumination is greater than the second threshold; and
   a control step of controlling brightness of each segment of the backlight unit based on the backlight brightness characteristic acquired in the backlight brightness characteristic acquisition step and a representative brightness value corresponding to each segment calculated in the representative brightness value calculation step.

10. The image display method according to claim 9, wherein the backlight brightness characteristic acquisition step includes:
    a step of preparing a backlight brightness characteristic storage device storing multiple backlight brightness characteristics including the first, second and third backlight brightness characteristics; and
    a backlight brightness characteristic selection step of selecting one backlight brightness characteristic from multiple backlight brightness characteristics stored in the backlight brightness characteristic storage device based on the illumination detected in the illumination detection step.

11. The image display method according to claim 9, wherein, in the third backlight brightness characteristic, the backlight brightness of the low brightness part of the image for display is set lower than the second backlight brightness characteristic.

12. The image display method according to claim 9, wherein, when maximum brightness is assumed to be 100%, the low brightness part of the image for display is less than 13% and the medium brightness part of the image for display is equal to or greater than 13% and equal to or less than about 40%.

* * * * *